US011517993B2

(12) United States Patent
Iwamura

(10) Patent No.: US 11,517,993 B2
(45) Date of Patent: Dec. 6, 2022

(54) CONTROL DEVICE AND CONTROL METHOD OF MACHINE

(71) Applicant: FANUC CORPORATION, Yamanashi (JP)

(72) Inventor: Yamato Iwamura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 537 days.

(21) Appl. No.: 16/785,399

(22) Filed: Feb. 7, 2020

(65) Prior Publication Data

US 2020/0254577 A1 Aug. 13, 2020

(30) Foreign Application Priority Data

Feb. 13, 2019 (JP) .............................. JP2019-023682

(51) Int. Cl.
*B23Q 15/22* (2006.01)
*G05B 19/4065* (2006.01)
*G05B 19/4093* (2006.01)
*B23Q 17/22* (2006.01)
*B23Q 16/00* (2006.01)

(52) U.S. Cl.
CPC ........... *B23Q 15/22* (2013.01); *B23Q 16/003* (2013.01); *B23Q 17/2233* (2013.01); *G05B 19/4065* (2013.01); *G05B 19/40938* (2013.01)

(58) Field of Classification Search
None
See application file for complete search history.

(56) References Cited

U.S. PATENT DOCUMENTS 6,397,111 B1 * 5/2002 Niwa .................. G05B 19/4155
700/169

FOREIGN PATENT DOCUMENTS

| JP | H05-060746 U | 8/1993 |
| JP | 2002-373008 A | 12/2002 |
| JP | 2007-185748 A | 7/2007 |
| JP | 2007-226648 A | 9/2007 |
| JP | 2011-070270 A | 4/2011 |

OTHER PUBLICATIONS

An Office Action; "Notice of Reasons for Refusal," mailed by the Japanese Patent Office dated May 25, 2021, which corresponds to Japanese Patent Application No. 2019-023682 and is related to U.S. Appl. No. 16/785,399 with English language translation.

* cited by examiner

*Primary Examiner* — Ryan A Jarrett
(74) *Attorney, Agent, or Firm* — Studebaker & Brackett PC

(57) ABSTRACT

A control device of a machine including: an operating condition analyzing unit that analyzes an operating condition of the program, and performs a notification when the tool to be exchanged is not adjusted; an operating condition storage unit that stores the operating condition of the program at a time of exchanging the tool; a state restoration confirming unit that confirms whether an internal state of the machine and/or the control device is restorable so that an operation of a predetermined block of the program is performed again after the operation and a stop of the predetermined block after exchanging the tool; and a state restoration executing unit that, in a case in which the internal state is confirmed to be restorable, restores the internal state to a state at the time of exchanging the tool based on the stored operating condition of the program at the time of exchanging the tool.

7 Claims, 8 Drawing Sheets

FIG .3

TOOL LIST

| No. | ADJUSTMENT | TOOL NAME | T CODE | TOOL LIFE (WEAR) |
|---|---|---|---|---|
| 1 | | TOOL 1 | T4424 | TIME OF USE/ (USABLE TIME) |
| 2 | AJUSTED | TOOL 2 | T4184 | NUMBER OF TIMES OF USE/ (NUMBER OF USABLE TIMES) |
| 3 | AJUSTED | TOOL 3 | Txxxx | / |
| 4 | | TOOL 4 | Txxxx | / |
| 5 | | TOOL 5 | Txxxx | / |

FIG. 5

OPERATING CONDITION OF PROGRAM
(TIME OF EXCHANGING TOOL)

- REVOLUTION NUMBER OF SPINDLE,
  COMMAND STATE OF SPINDLE
- G-CODE MODAL
- MACRO VARIABLE          } MODAL INFORMATION
- FEED RATE
- COORDINATE VALUE OF EACH AXIS
- SPECIFIC INFORMATION OF SELECTED PROGRAM
- PROGRAM POINTER
- LAST UPDATE DATE AND TIME OF PROGRAM

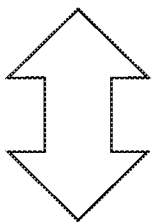

INTERNAL STATE OF MACHINE TOOL AND
NUMERAL CONTROL DEVICE (UNRESTORABLE STATE)

- CURRENT COORDINATE VALUE OF EACH AXIS
- PROGRAM

FIG. 6

OPERATING CONDITION OF PROGRAM
(TIME OF EXCHANGING TOOL)

- REVOLUTION NUMBER OF SPINDLE, COMMAND STATE OF SPINDLE
- G-CODE MODAL ⎫
- MACRO VARIABLE ⎬ MODAL INFORMATION
- FEED RATE ⎭
- COORDINATE VALUE OF EACH AXIS
- SPECIFIC INFORMATION OF SELECTED PROGRAM
- PROGRAM POINTER
- LAST UPDATE DATE AND TIME OF PROGRAM

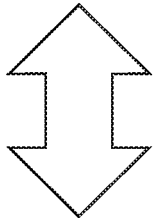

INTERNAL STATE OF MACHINE TOOL AND NUMERAL CONTROL DEVICE

- NUMBER OF REVOLUTIONS OF SPINDLE, COMMAND STATE OF SPINDLE
- G-CODE MODAL
- MACRO VARIABLE
- FEE RATE
- SELECTED PROGRAM
- PROGRAM POINTER

FIG. 7A
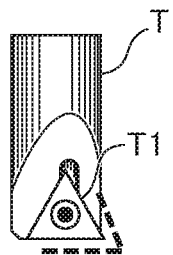
FIG. 7B
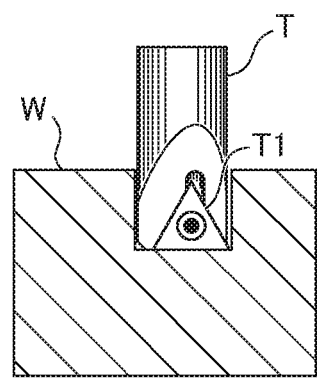
FIG. 7C
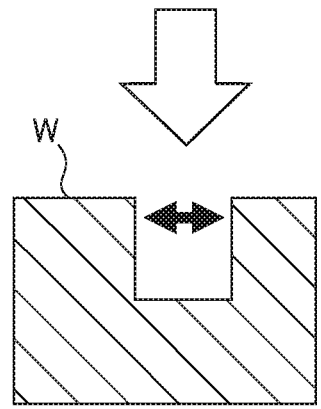
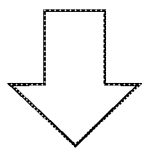
ADJUSTING TOOL IS ENDED
DJUSTING MACHINING DIMENSION
IN RADIAL DIRECTION OF BORING PROCESS IS ENDED

PREDETERMINED BLOCK

CONTROL DEVICE AND CONTROL METHOD OF MACHINE

This application is based on and claims the benefit of priority from Japanese Patent Application No. 2019-023682, filed on 13 Feb. 2019, the content of which is incorporated herein by reference.

BACKGROUND OF THE INVENTION

Field of the Invention

The present invention relates to a control device that controls a machine tool or a machine such as an industrial robot.

Related Art

It has been known that a control device for a machine tool or a machine such as an industrial robot has a function of stopping and restarting a program in order to make adjustments to a tool that requires adjustment (for example, refer to Japanese Unexamined Patent Application, Publication No. H5-60746).

Patent Document 1: Japanese Unexamined Utility Model Application, Publication No. H05-60746

SUMMARY OF THE INVENTION

In the adjustment of such a tool, the adjustment of the tool and the trial running (stopping and restarting) of a program are manually repeated while an operator confirms whether or not the desired machining dimension is realized.

Therefore, it is desired to simplify the stopping and restarting of a program for adjusting a tool in a control device of a machine.

A control device according to an aspect of the present disclosure is a control device of a machine having a function of stopping and restarting a program in order to perform an adjustment of a tool that requires adjustment, the control device including: an operating condition analyzing unit that analyzes an operating condition of the program at a time of starting operation of the program, and performs a notification when the tool to be exchanged is not adjusted; an operating condition storage unit that stores the operating condition of the program at a time of exchanging the tool; a state restoration confirming unit that confirms whether an internal state of at least one of the machine and the control device is restorable so that an operation of a predetermined block of the program is performed again after the operation and a stop of the predetermined block after exchanging the tool; and a state restoration executing unit that, in a case in which the internal state of the at least one of the machine and the control device is confirmed to be restorable by the state restoration confirming unit, restores the internal state of the at least one of the machine and the control device to a state at the time of exchanging the tool based on the operating condition of the program at the time of exchanging the tool stored in the operating condition storage unit.

According to one aspect, it is possible to simplify the stopping and restarting of a program for adjusting a tool in a control device of a machine.

BRIEF DESCRIPTION OF THE DRAWINGS

FIG. 3 is a diagram showing an example of a tool list of an operating condition analyzing unit in the numerical control device shown in FIG. 1;

FIG. 5 is a diagram for explaining the confirmation of whether an internal state of the machine tool and an internal state of the numerical control device are restorable by a state restoration confirming unit in the numerical control device shown in FIG. 1;

FIG. 6 is a diagram for explaining the restoration of the internal state of the machine tool and the internal state of the numerical control device by a state restoration executing unit in the numerical control device shown in FIG. 1.

FIGS. 7A to 7C are diagrams for explaining an overview of an adjustment method of a tool in a boring process; and FIGS. 8A to 8C are diagrams for explaining the overview of the functions of stopping and restarting a program for adjusting a tool in the boring process.

DETAILED DESCRIPTION OF THE INVENTION

Figure 1:
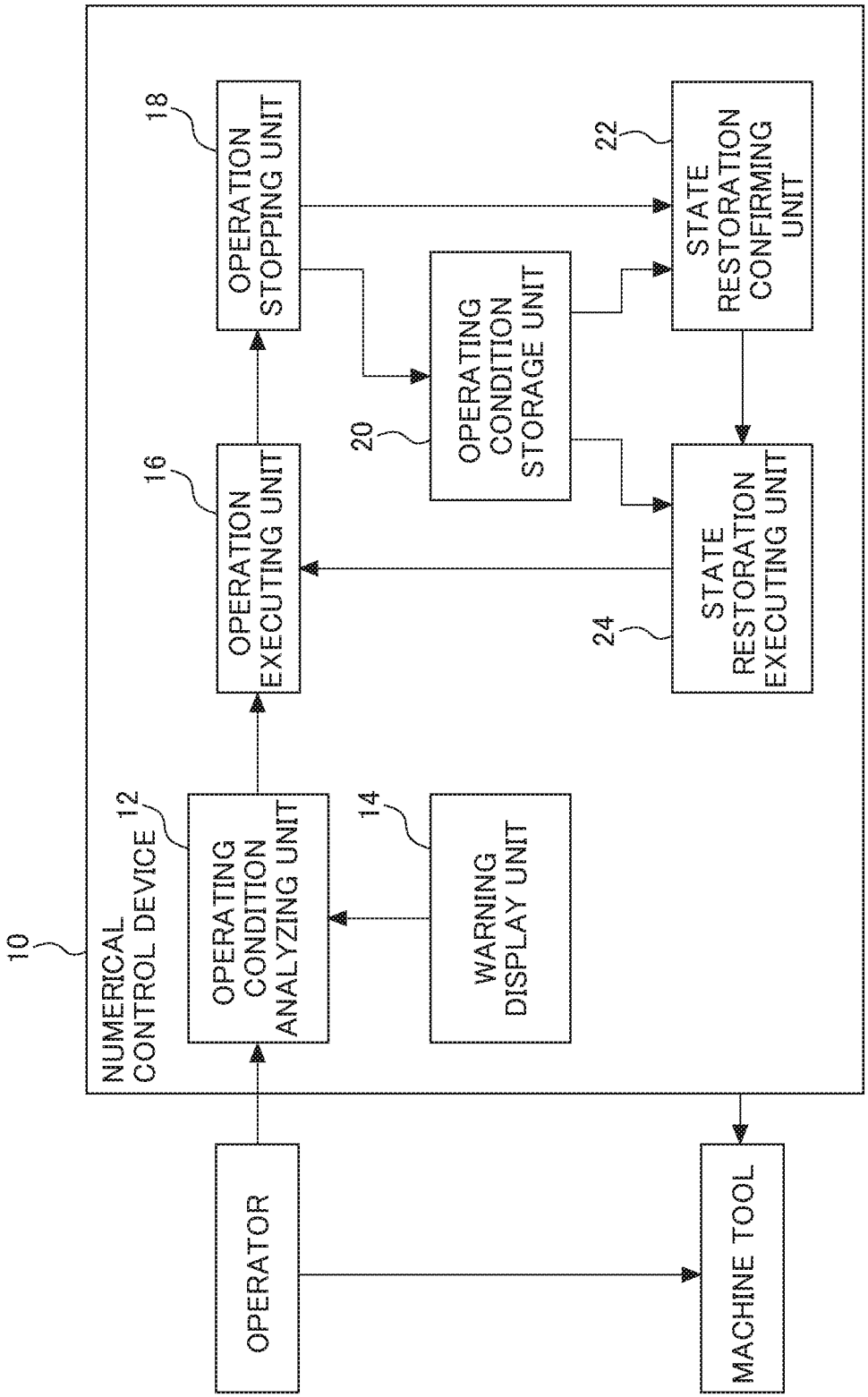
FIG. 1 is a diagram showing the configuration of a numerical control device of a machine tool according to one embodiment of the present invention.

In the following, an example of an embodiment of the present invention will be described with reference to the attached drawings. It should be noted that the same reference symbols will be attached to identical or corresponding portions in the respective drawings.

(Overview)

FIGS. 7A to 7C are diagrams for explaining an overview of an adjustment method of a tool in a boring process. In the boring process, since the cutting resistance at the start of cutting is large, the resultant cut by the tool may be larger than the diameter of the tool. For this reason, trial machining is performed with the diameter of the tool being smaller than a desired machining dimension.

For example, as shown in FIGS. 7A to 7C,

FIG. 7A shows a step (A) of adjusting the length of a cutting edge T1 of a tool T, FIG. 7B shows a step (B) of running a program to machine workpiece W, and FIG. 7C shows a step (C) of, after the running of the program, measuring the machining dimension in the radial direction of a boring processed part of the workpiece W. If a desired machining dimension is not obtained, repeat the above steps (A) to (C) until the desired machining dimension is obtained. In this manner, an operator manually adjusts the tool, i.e., adjusts the machining dimension in the radial direction of the boring process.

FIGS. 8A to 8C are diagrams for explaining an overview of the function of stopping and restarting a program for adjusting a tool in the boring process. The main commands of the program shown in FIGS. 8A to 8C are as follows.

T4424: Tool Command
M06: Tool exchange Command
S49M3M8: Codes for specifying operating conditions of the program
M1: Suspension Command When this program is run, FIG. 8A shows (A): where the tool is exchanged with the tool "T4424" according to the tool exchange command "M06".

FIG. 8B shows (B): where thereafter, a predetermined block of the program is operated to machine the workpiece W.

FIG. 8C shows (C): where in the suspension command "M1", the program is suspended. For example, the operation of the program of (B) may be executed in a state in which the program is stopped by the suspension command "M1" by an operator performing, for example, a stop operation of the program (for example, pressing a program stop button) in advance. At this time, the operator measures the machining dimension in the radial direction of the boring processed part of the workpiece W as described above in (C).

(A) if a desired machining dimension is not obtained, the operator adjusts the length of the blade T1 of the tool T as described above in (A). Thereafter, the operator manually moves the cursor position directly under the tool exchange command "M6", and performs the restart operation of the program.

The function of stopping and restarting the program for adjusting the tool has the following problems.
(1) After stopping the program, the operator needs to perform a cursor operation to a position where the operation of the predetermined block is repeated.
(2) Code needs to be inserted to undo the internal state of the machine tool and the numerical control device.
(3) If the operator does not notice the exchange of the unadjusted tool, there is a risk of continuous machining being performed in a state where the adjustment is not performed even once after the tool exchange.
(4) If the forced stop command "M0" is set instead of M1 at the end of the predetermined block in order to prevent the risk of (3) described above, there is also a risk M0 being forgotten to be erased before the main operation of the program after the tool exchange.

Hereinafter, an example of a numerical control device of a machine tool capable of solving problems (1) to (4) described above will be described.

Present Embodiment

FIG. 1 is a diagram showing the configuration of a numerical control device of a machine tool according to the present embodiment. The numerical control device 10 shown in FIG. 1 is, for example, a device for controlling a machine tool for performing the above-described boring process. The numerical control device 10 has the function of stopping and restarting a program in order to perform the adjustment of the tool that requires adjustment. The numerical control device 10 includes an operating condition analyzing unit 12, a warning display unit 14, an operation executing unit 16, an operation stopping unit 18, an operating condition storage unit 20, a state restoration confirming unit 22, and a state restoration executing unit 24.

The numerical control device 10 (excluding the warning display unit 14 and the operating condition storage unit 20) is configured by, for example, an arithmetic processor such as a DSP (Digital Signal Processor) or a FPGA (Field Programmable Gate Array). Various functions of the numerical control device 10 are realized by executing predetermined software (programs, applications) stored in a storage unit, for example. The various functions of the numerical control device 10 may be realized by cooperation between hardware and software.

The warning display unit 14 is, for example, a display device such as a liquid crystal display. The operating condition storage unit 20 is, for example, rewritable memory such as EEPROM or a rewritable disk such as an HDD (Hard Disk Drive) or an SSD (Solid State Drive).

Figure 2:
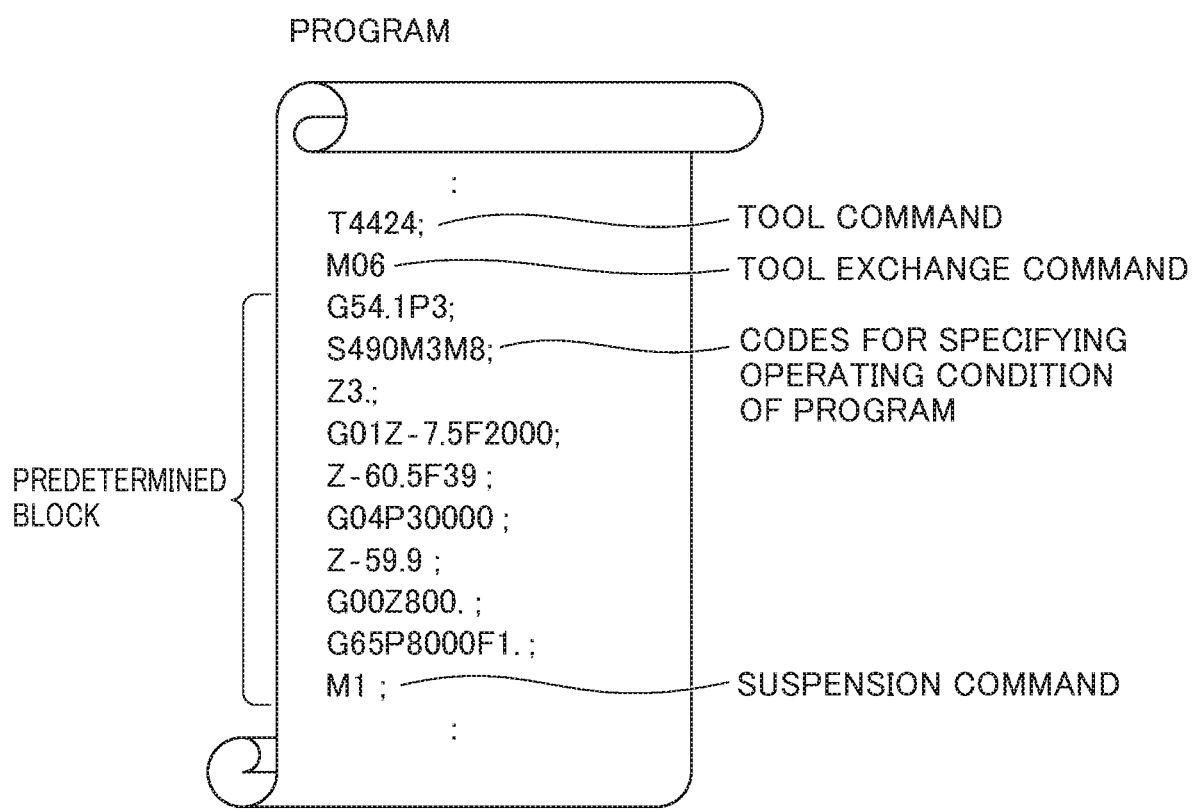
FIG. 2 is a diagram showing an example of a program operated by the numerical control device shown in FIG. 1.

The operating condition analyzing unit 12 analyzes the operating condition (operation information) of the program at the time of starting the operation of the program, and analyzes whether or not the tool to be exchanged is not adjusted. FIG. 2 is a diagram showing an example of a program, and FIG. 3 is a diagram showing an example of a tool list. For example, the operating condition analyzing unit 12 stores the tool list shown in FIG. 3 in advance. The tool list includes information on whether or not the adjustment is completed for each tool. For example, as shown in FIG. 2, the operating condition analyzing unit 12 recognizes the tool to be exchanged by the tool command "T4424" preceding the tool exchange command "M06" in the program. The operating condition analyzing unit 12 refers to the tool list and analyzes whether or not the tool to be exchanged is not adjusted.

When a plurality of types of tools are used in the program, the T command immediately before the tool exchange command "M06" may be listed and the above analysis may be performed for all types of tools.

The operating condition analyzing unit 12 may manage the tool list as follows. For example, the operating condition analyzing unit 12 sets the adjustment state of the tool as not adjusted (for example, "adjusted" is deleted) in the following cases.

When an operator sets the setting as not adjusted (when registering a new tool)

When entering new tool data (when newly registering a tool)

When the wear data is cleared (when newly registering a tool)

When machining is performed with a tool for a predetermined time or longer (when the tool is used for the predetermined time or longer)

In addition, for example, the operating condition analyzing unit 12 sets the adjustment state of the tool as the adjusted state in the following case (for example, "adjusted" is input).

When an operator performs the adjustment completion operation (when the adjustment of the tool is completed)

When the operating condition analyzing unit 12 analyzes as the tool being adjusted, the operation executing unit 16, which will be described later, executes the operation of the program. On the other hand, when the operating condition analyzing unit 12 analyzes that the tool is not adjusted, the operation condition analyzing unit 12 notifies the operator via the warning display unit 14.

The warning display unit 14 notifies the operator by displaying a warning when the operating condition analyzing unit 12 analyzes as the tool not being adjusted. As a result, the operator can recognize that the exchanged tool is not adjusted, and can execute the operation of the program of (B) described above in a state in which the program is stopped by the suspension command "M1" by, for example, the operator performing a program stop operation (e.g., pressing a program stop button) in advance. As a result, the operator can suspend the program by the suspension command "M1" of (C) described above, and measure the machining dimension in the radial direction of the boring processed part of the workpiece W of (C) described above (problems (3) and (4) described above are solved).

The operation executing unit 16 performs the exchange of the tool and performs the boring process by executing the operation of the program.

The operation stopping unit 18 stops the operation of the program. For example, as shown in FIG. 2, the operation is stopped based on the suspension command "M1" in the program and the stop operation by the operator.

Figure 4:
FIG. 4 is a diagram showing an example of operating conditions of a program at the time of exchanging a tool stored in an operating condition storage unit in the numerical control device shown in FIG. 1.

The operating condition storage unit 20 stores operating conditions of the program at the time of the exchange of tools. FIG. 4 is a diagram showing an example of operating conditions of the program at the time of exchanging the tools stored in the operating condition storage unit. As shown in FIG. 4, the operating conditions of the program include the following operating conditions.

Rotation speed (revolution number) of the spindle and the command state of the spindle Modal information (e.g., G-code modal, M-code modal, S-code modal, macro variable, feed rate)

Coordinate value of each axis

Specific information of the selected program (e.g., program path and program name)

Program pointer

Last update date and time of the program

The state restoration confirming unit 22 confirms whether an internal state of the machine tool and an internal state of the numerical control device are restorable so that the operation of a predetermined block is performed again after the operation and the stop of the predetermined block of the program after the exchange of the tool.

The internal states of the machine tool and the numerical control device include a restorable state and an unrestorable state. The unrestorable state is a program and a coordinate value of each axis. The restorable state is at least one of the revolution number of a spindle, the command state of the spindle, modal information, specific information of the selected program, and a program pointer.

FIG. 5 is a diagram for explaining the confirmation of whether the internal state of the machine tool and the internal state of the numerical control device are restorable by the state restoration confirming unit. The state restoration confirming unit 22 confirms that the internal state of the machine tool and the internal state of the numerical control device are restorable in a case in which the unrestorable state matches the operating condition of the program at the time of exchanging the tool.

It should be noted that, in the first operation at the time of the operation of the program after the restart, if there is no axis of the incremental command, the restoration may be made executable if the coordinate value is within a certain range. It should also be noted that, if the last update date and time of the program match, the programs themselves match each other.

In a case in which the internal states of the machine tool and the numerical control device are confirmed to be restorable by the state restoration confirming unit 22, the state restoration executing unit 24 restores the internal states of the machine tool and the numerical control device to the state at the time of exchanging the tool based on the operating conditions of the program at the time of exchanging the tool stored in the operating condition storage unit 20.

FIG. 6 is a diagram for explaining the restoration of the internal state of the machine tool and the internal state of the numerical control device by the state restoration executing unit. The state restoration executing unit 24 restores the restorable state in the internal states of the machine tool and the numerical control device so that the restorable state in the internal states of the machine tool and the numerical control device matches the operating condition of the programs at the time of exchanging the tool. As a result, the internal state of the machine tool and the internal state of the numerical control device are automatically restored to the state at the time of exchanging the tool. As a result, for example, the program pointer (cursor position) is restored, so that the operator does not need to manually move the cursor position directly under the tool exchange command "M6" (the above problem (1) is solved). In addition, even if the desired machining dimension cannot be obtained, the operator can perform the same operation as the operation after the exchanging of the tool, that is, the same machining as the machining after the exchanging of the tool again by simply performing the restart operation of the program (the abovementioned problem (2) is solved).

In a case in which the state restoration confirming unit 22 confirms that the internal states of the machine tool and the numerical control device cannot be restored, that is, when the unrestorable state does not match the operating condition of the program at the time of exchanging the tool, an operation similar to the operation after exchanging the tool, that is, machining similar to the machining after exchanging the tool cannot be performed again, and therefore, for example, the numerical control device 10 may perform a notification by displaying a warning.

For example, if the coordinate values of the respective axes do not match each other, for example, the numerical control device 10 may notify the operator of such a result. This allows the operator to manually update the positions of the axes and restore the internal state of the machine tool and the internal state of the numerical control device.

Similarly, for example, if the programs do not match, for example, the numerical control device 10 may notify the operator of such a result. In this case, since the numerical control device cannot determine the intent of changing the programs, the operator is notified. Since the internal states (modal information) of the machine tool and the numerical control device change depending on the operation of the program, it can be determined that there is no problem by restoring the internal state to the original state at the time of restarting the program. However, the determination of the operator is sought because the program is not changed by the operation and a particular event has occurred.

As described above, according to the numerical control device 10 of the present embodiment, the operating condition (information) analyzing unit analyzes the operating condition (information) of the program at the time of starting the operation of the program, and performs a notification when the tool to be exchanged is not adjusted. This makes it possible to stop the program for adjusting the tool in a simple and reliable manner.

In addition, according to the numerical control device 10 of the present embodiment, the operating condition storage unit stores the operating condition of the program at the time of exchanging the tool, the state restoration confirming unit confirms whether or not the internal state of at least one of the machine and the control device is restorable so that the operation of the predetermined block is performed again after the operation and stop of the predetermined block of the program after exchanging the tool, and in a case in which it is confirmed to be restorable, the state restoration executing unit restores the internal state of at least one of the machine and the control device to the state at the time of exchanging the tool based on the operating condition of the program at the time of exchanging the tool stored in the operating condition storage unit. As a result, the program for adjusting the tool can be restarted easily and reliably.

Incidentally, although the applicants of the present application have filed an application which relates to stopping and restarting a program (for example, Japanese Patent No. 4374045), the stopping and restarting of the program of the present invention differs from the stopping and restarting of the program of the invention described in Japanese Patent No. 4374045 in the following points.
(Purpose)

The invention described in Japanese Patent No. 4374045 has an object of restarting the interrupted machining and completing the machining when the machining is interrupted midway (i.e., not restarting the machining from the same point once restarted). On the other hand, the present invention has an object of facilitating the repetition of the adjustment for the intended adjustment in a tool that requires adjustment (i.e. repeating the restoration to the same state many times until the intended adjustment is made).
(Restart Point)

The invention described in Japanese Patent No. 4374045 is configured to be determined by a non-cutting command (program command). An operator selects an appropriate restart point from a plurality of restart points. On the contrary, in the present invention, a restart point is determined when an unadjusted tool is fitted to the spindle, instead of the order of a tool exchange to an unadjusted tool and program command. The restart point is also uniquely determined.

Although embodiments of the present invention have been described above, the present invention is not limited to the embodiments described above, and various modifications and variations are possible. For example, in the embodiment described above, a numerical control device of the machine tool for performing the boring process is exemplified; however, the present disclosure is not limited to this, and the present disclosure is applicable to the control device of various machines such as machine tools or industrial robots using various tools requiring adjustments.

EXPLANATION OF REFERENCE NUMERALS 10 numerical control device of machine tool (control device of machine)
12 operating condition analyzing unit
14 warning display unit
16 operation executing unit
18 operation stopping unit
20 operating condition storage unit
22 state restoration confirming unit
24 state restoration executing unit

What is claimed is:

1. A control device of a machine having a function of stopping and restarting a program in order to perform an adjustment of a tool that requires adjustment, the control device comprising:
    an operating condition analyzing unit that analyzes an operating condition of the program at a time of starting operation of the program, and performs a notification when the tool to be exchanged is not adjusted;
    an operating condition storage unit that stores the operating condition of the program at a time of exchanging the tool;
    a state restoration confirming unit that confirms whether an internal state of at least one of the machine and the control device is restorable so that an operation of a predetermined block of the program is performed again after the operation and a stop of the predetermined block after exchanging the tool; and
    a state restoration executing unit that, in a case in which the internal state of the at least one of the machine and the control device is confirmed to be restorable by the state restoration confirming unit, restores the internal state of the at least one of the machine and the control device to a state at the time of exchanging the tool based on the operating condition of the program at the time of exchanging the tool stored in the operating condition storage unit.

2. The control device of the machine according to claim 1, wherein the internal state of the at least one of the machine and the control device includes a restorable state and an unrestorable state,
    the state restoration confirming unit, in a case in which the unrestorable state matches the operating condition of the program at the time of exchanging the tool, confirms that the internal state of the at least one of the machine and the control device is restorable, and
    the state restoration executing unit restores the restorable state so that the restorable state matches the operating condition of the program at the time of exchanging the tool.

3. The control device of the machine according to claim 2, wherein the unrestorable state in the internal state of the at least one of the machine and the control device, and the operating condition of the program are a program, and a coordinate value of each axis, and
    the restorable state in the internal state of the at least one of the machine and the control device, and the operating condition of the program are at least one of a revolution number of a spindle, a command state of the spindle, modal information, specific information of a selected program, and a program pointer.

4. The control device of the machine according to claim 1, wherein the operating condition analyzing unit manages an adjustment state of the tool, and analyzes whether the tool to be exchanged is not adjusted based on the adjustment state of the tool that is being managed.

5. The control device of the machine according to claim 4, wherein the operating condition analyzing unit sets the adjustment state of the tool as not adjusted in a case in which the tool is newly registered or the tool is used for a predetermined time or longer, and sets the adjustment state of the tool as adjusted in a case in which the adjustment of the tool is completed.

6. The control device of the machine according to claim 1, wherein the program includes a command for suspending the operation of the program midway at an end of the predetermined block after exchanging the tool.

7. The control device of the machine according to claim 1, wherein the tool is a tool for a boring process, and
    the adjustment of the tool is an adjustment of a tool for adjusting a machining dimension in a radial direction of the boring process.

* * * * *